United States Patent

Oguchi

Patent Number: 5,705,866
Date of Patent: Jan. 6, 1998

[54] SPINDLE MOTOR

[75] Inventor: Norikazu Oguchi, Komagane, Japan

[73] Assignee: Nidec Corporation, Kyoto, Japan

[21] Appl. No.: 459,360

[22] Filed: Jun. 2, 1995

[30] Foreign Application Priority Data

Jun. 9, 1994 [JP] Japan .................... 6-152989
Jun. 30, 1994 [JP] Japan .................... 6-173200

[51] Int. Cl.⁶ .................................................. H02K 7/00
[52] U.S. Cl. .............................. 310/67 R; 310/90; 310/91
[58] Field of Search ............................. 310/67 R, 71,
310/89, DIG. 6, 91, 90; 360/98.07, 99.08, 99.04

[56] References Cited

U.S. PATENT DOCUMENTS

| | | | |
|---|---|---|---|
| 4,724,346 | 2/1988 | Klein et al. | 310/67 R |
| 4,779,165 | 10/1988 | Elsaesser et al. | 360/97 |
| 4,806,808 | 2/1989 | Grecksch et al. | 310/71 |
| 4,814,652 | 3/1989 | Wright | 360/98.07 |
| 4,900,958 | 2/1990 | Kitahara et al. | 310/67 R |
| 4,928,029 | 5/1990 | Wright | 310/89 |
| 5,006,765 | 4/1991 | Schmider | 310/71 |
| 5,061,868 | 10/1991 | Iwazaki et al. | 310/67 R |
| 5,064,377 | 11/1991 | Wood | 439/67 |
| 5,173,628 | 12/1992 | Yoshida et al. | 310/71 |
| 5,214,326 | 5/1993 | Yonei | 310/67 R |
| 5,216,304 | 6/1993 | Ohta | 310/67 R |
| 5,256,922 | 10/1993 | Tanaka et al. | 310/71 |
| 5,459,361 | 10/1995 | Morioka | 310/67 R |
| 5,483,113 | 1/1996 | Sakuragi et al. | 310/67 R |
| 5,541,787 | 7/1996 | Jabbari et al. | 360/97.01 |
| 5,594,606 | 1/1997 | Hans et al. | 360/99.08 |

*Primary Examiner*—Clayton E. LaBalle
*Assistant Examiner*—Michael J. Wallace, Jr.
*Attorney, Agent, or Firm*—McCormick, Paulding & Huber

[57] ABSTRACT

A spindle motor comprises a stationary shaft, a rotor hub having an annular rotor magnet and rotatably mounted by bearings to the stationary shaft, a stator fixedly mounted to the stationary shaft so as to face the rotor magnet, a flexible printed circuit board connected to leads from the stator, and a reinforcement member composed of an annular plate portion and a tubular portion extending axially from the inner edge of the plate portion and disposed between the stationary shaft and the stator. For assembly, the stator is fitted onto the outer side of the tubular portion and then, the flexible printed circuit board is mounted to the plate portion of the reinforcement member. The tubular portion of the reinforcement member is joined to the outer side of the stationary shaft. Accordingly, the flexible printed circuit board is strengthened effectively and the assembly of the components will be eased.

11 Claims, 3 Drawing Sheets

SPINDLE MOTOR

FIELD OF THE INVENTION

The present invention relates to a spindle motor for rotating disks (including magnetic disks and optical disks).

DESCRIPTION OF THE PRIOR ART

In general, a spindle motor for rotating a recording medium such as a magnetic or optical disk comprises a base provided in a disk drive apparatus or a stationary member, e.g. a bracket, mounted to the base, a rotor rotatably mounted by bearings to the stationary member, a rotor magnet mounted to the rotor, and a stator mounted to the stationary member so as to face the rotor magnet. The rotor is arranged to hold the recording medium or disk.

The stator in such a spindle motor is connected by coil leads to a control circuit for disk drive operation. For example, in U.S. Pat. No. 5,216,304 coil leads from the stator to a printed circuit board pass from a printed circuit board along a center bore provided in the stationary member or shaft to the outside of the motor.

The disadvantage of the spindle motor is that the stator and the printed circuit board are mounted to the stationary shaft respectively thus decreasing the working efficiency during assembly of the motor. After completion of the installation of both the stator and printed circuit board, the stator is electrically connected to the printed circuit board and the leads from the printed circuit board are passed through the center bore of the stationary shaft. This will also impair the working efficiency.

For improvement, a flexible printed circuit board is employed. The flexible printed circuit board of a ring shape is first bonded by adhesive to coils of an axially facing side of the stator and the coil leads from the stator are connected to the printed circuit board. Then, the stator with the flexible printed circuit board is fixedly mounted to the stationary shaft with leads being connected to the flexible printed circuit board. Accordingly, as the coil leads have been connected to the printed circuit board before the mounting of the stator to the stationary shaft, the working efficiency for assembly will be improved.

However, the direct bonding of the flexible printed circuit board to the stator permits only a part of the printed circuit board to be secured to the coils of the stator, ensuring less bonding strength. Also, the flexible printed circuit board is likely to deflect or twist when bonded only partially.

SUMMARY OF THE INVENTION

A first embodiment of the present invention is to provide a spindle motor in which the connection of coil leads from a stator can be implemented before mounting of the stator to a stationary shaft.

A second embodiment of the present invention is to provide a spindle motor in which the connection of coil leads from a stator to a flexible printed circuit board can be implemented while the flexible printed circuit board is being reinforced.

Other objects and advantages of the present invention will be apparent from the following description.

DETAILED DESCRIPTION OF THE PREFERRED EMBODIMENTS

Preferred embodiments of the present invention will be described in more details referring to the accompanying drawings.

Figure 1:
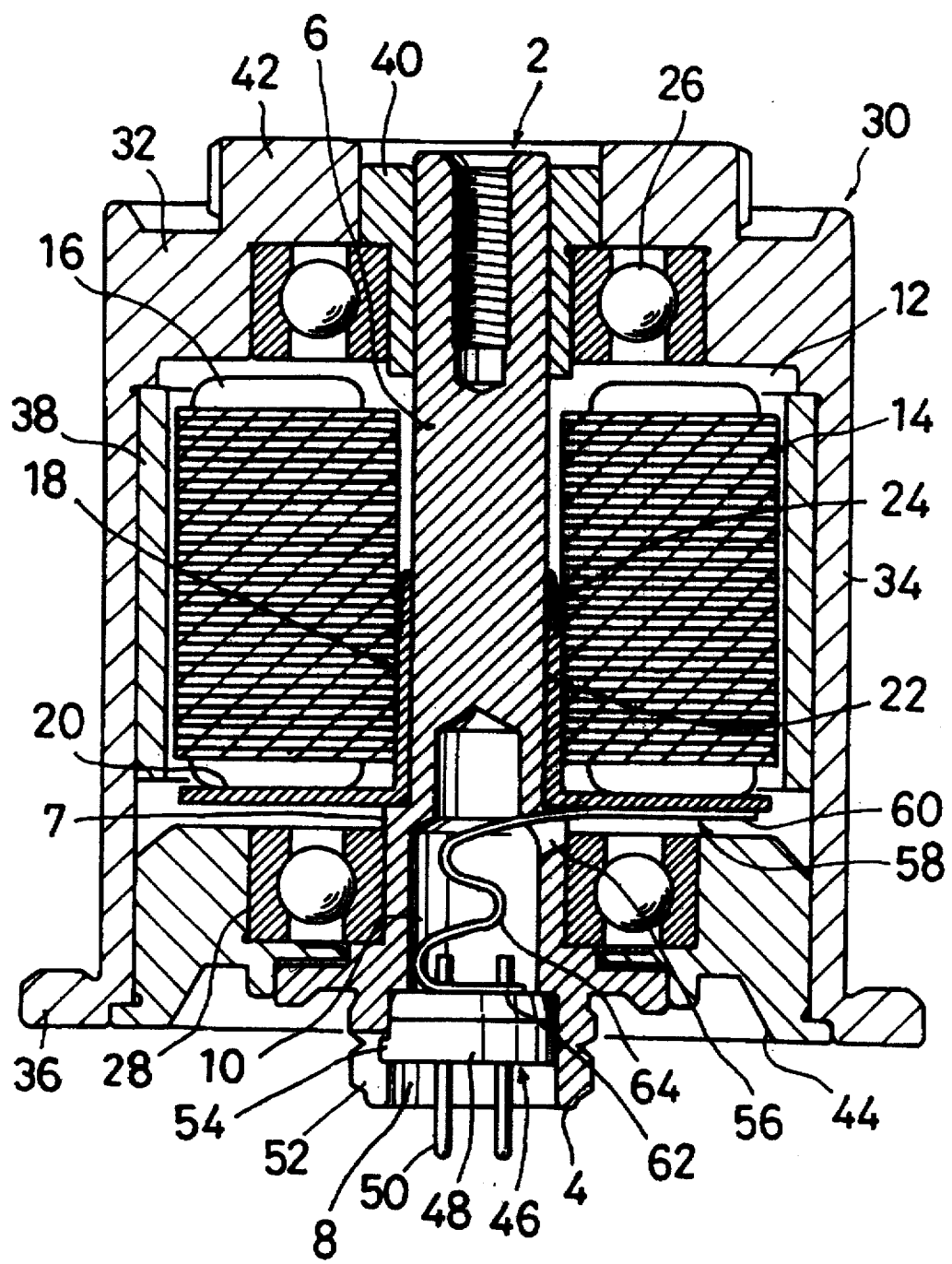
FIG. 1 is a cross sectional view of a first embodiment of a spindle motor according to the present invention.

A first embodiment of the present invention in the form of a spindle motor will be explained in conjunction with FIG. 1.

A stationary shaft 2 comprises a mounting portion 4 at the distal end (or lowermost) thereof for mounting to a base of a hard disk apparatus (not shown) and a support shaft portion 6 integral with the mounting portion 4 and extending upwardly. The mounting portion 4 has an opening 8 provided in the lower end thereof for accommodating a connector which will be described later and which communicates upwardly with a bore 10 provided in lower portion of the support shaft portion 6.

A stator 12 is fixedly mounted on the support shaft portion 6 of the stationary shaft 2. More particularly, the stator 12 comprises a stator core 14 made of silicon steel and stator coils 16 wound on the stator core 14 and is mounted by a reinforcement member 18 made of stainless steel to the outer side of the support shaft portion 6.

The reinforcement member 18 comprises an annular plate portion 20 having an outer diameter substantially identical to that of the stator core 14 and an inner diameter substantially identical to the outer diameter of the support shaft portion 6 of the stationary shaft 2, and a tubular portion 22 extending axially from the inner edge of the plate portion 20. The stator 12 is assembled with the stationary shaft 2 by fitting the stator 12 onto the outer side of the tubular portion 22 and then, mounting the tubular portion 22 to the outer side of the support shaft portion 6. As the reinforcement member 18 is positioned with its tubular portion 22 placed on a step 7 which is arranged on the support shaft portion 6, the stator 12 is correctly mounted to the stationary shaft 2. Also, the tubular portion 22 of the reinforcement member 18 has a radially reduced region 24 at the upper end thereof for ease of inserting into the stator core 14.

A rotor hub 30 of aluminum having substantially a cylindrical shape is rotatably mounted by a pair of bearings 26, 28 to the stationary shaft 2. The rotor hub 30 has at an upper end an inwardly extending portion 32 to hold the bearing 26 and at an outer end a wall portion 34 around which a recording disk is placed. An outwardly extending portion 36 is provided at the lower end of the wall portion 34 of the rotor hub 30 for supporting the disk. An annular rotor magnet 38 is fixedly mounted to the inner side of the wall portion 34 so that it faces the stator 12.

A labyrinth member 40 which also acts as a pressurizing member is disposed between the upper end of the support shaft portion 6 of the stationary shaft 2 and the bearing 26. Threaded portion 42 of the inwardly extending portion 32 covers the top of the bearing 26, and is spaced by a very small gap from member 40 creating a labyrinth.

The other bearing 28 is fitted on the lower end of the support shaft portion 6 of the stationary shaft 2. An annular bearing holder 44 is disposed between the bearing 28 and the lower end of the inner side of the wall portion 34 of the rotor hub 30. The bearing holder 44 is spaced by a very small gap from the mounting portion 4 of the stationary shaft 2 creating a labyrinth.

The connector denoted by 46 is accommodated in the opening 8 and comprises a body 48 and four pins 50 arranged across the body 48 for a three-phase motor drive. The connector body 48 has a specific configuration capable of detachably fitting in the opening 8 of the mounting portion 4. In addition, the connector body 48 has an engaging portion 54 thereof for engagement with a keyway 52 provided in the mounting portion 4 of the stationary shaft 2.

The support shaft portion 6 has a generally radial through hole 56 therein which extends towards the stator 12. This allows four coil leads from the stator 12 to be connected along a flexible printed circuit board 58 to the connector 46. More specifically, the flexible printed circuit board 58 comprises a coil terminal 60 at one end, a connector terminal 62 at the other end, and a lead region 64 connecting between the two terminals 60 and 62. The coil terminal 60 is bonded to the lower side of the plate portion 20 of the reinforcement member 18 and its (land) strips are connected to the four coil leads from the stator 12. As the lead region 64 and the connector terminal 62 of the printed circuit board 58 extend along the through hole 56 and the center bore 10, the flexible printed circuit board 58 is connected at its connector terminal 62 to the pins 50 of the connector 46.

In assembly of the spindle motor of the first embodiment, the stationary shaft 2 and the stator 12 are joined to each other by fitting the stator core 14 of the stator 12 onto the tubular portion 22 of the reinforcement member 18, bonding the coil terminal 60 of the flexible printed circuit board 58 to the lower side of the plate portion 60 of the reinforcement member 18, and soldering the coil leads from the stator 12 to their respective strips of the coil terminal 60.

This procedure is followed by fitting the tubular portion 22 of the reinforcement member 18 onto the support shaft portion 6 of the stationary shaft 2 to complete the assembly of the stationary shaft 2. Then, the connector terminal 62 and lead portion 64 of the flexible printed circuit board 58 are passed through hole 56 and the center bore 10 in the stationary shaft 2. When the connector terminal 62 with the lead portion 64 has been drawn out of the opening 8, it is joined to the connector 46 which is then accommodated in the opening 8 of the stationary shaft 2.

Accordingly, the reinforcement member 18 is effectively increased in physical strength with the coil terminal 60 of the flexible printed circuit board 58 being bonded to the lower side of the plate portion 20 of the reinforcement member 18. Also, after the stator 12 including the coils 16 is assembled with the reinforcement member 18 to which the flexible printed circuit board 58 is bonded is completed, its coil leads are joined to the printed circuit board 58. As the result, the joining of the coil leads will be facilitated improving the efficiency of the assembly process.

Figure 2:
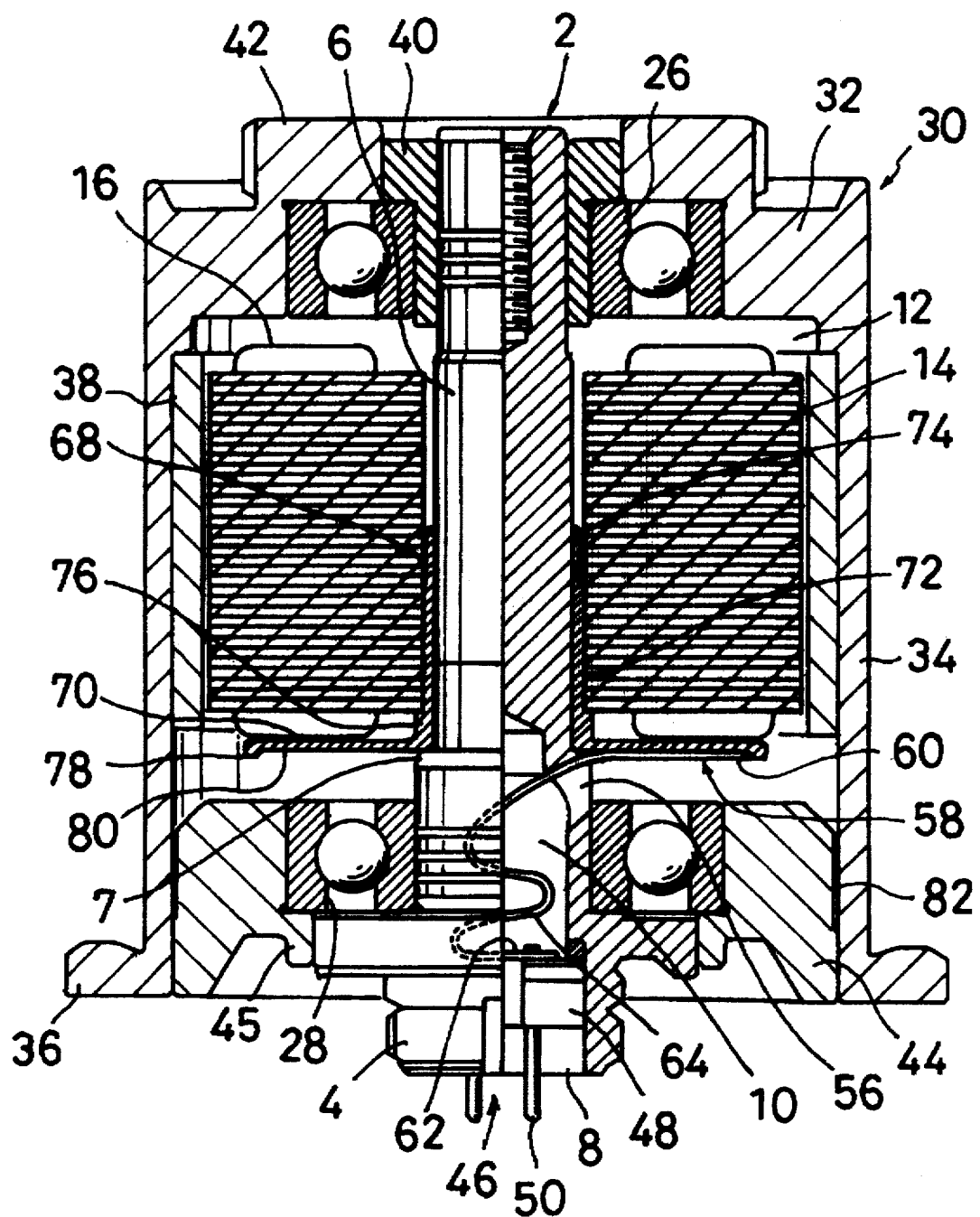
FIG. 2 is a cross sectional view of a second embodiment of a spindle motor according to the present invention.

A second embodiment of the present invention will now be described referring to FIG. 2. It should be noted that like components are denoted by like numerals as of FIG. 1 and will be explained in no more detail.

A spindle motor of the second embodiment is distinguished from that of the first embodiment by the fact that the reinforcement member 18 for mounting the stator 12 to the support shaft portion 6 of the stationary shaft 2 is replaced with a modified member 68. The modified reinforcement member 68 comprises an annular plate portion 70 having an outer diameter substantially identical to that of the stator core 14 and an inner diameter substantially identical to the outer diameter of the support shaft portion 6 of the stationary shaft 2, and a tubular portion 72 extending axially from the inner edge of the plate portion 70. Also, a radially reduced portion 74 is provided on the distal or upper end of the tubular portion 72 for ease of fitting the stator core 14 onto the tubular portion 72 of the reinforcement member 68. The reinforcement member 68 has a step portion 76 provided at the lower end of the outer side of the tubular portion 72 for positioning and directly supporting the stator core 14 of the stator 12. In addition, an annular projection 78 is provided on the outer edge of the plate portion 70 extending downwardly or in the direction opposite to the stator 12, thus defining a planar recess 80 in the lower side of the plate portion 70. The planar recess 80 is adapted to accept the coil terminal 60 of the flexible printed circuit board 58.

In assembly of the spindle motor of the second embodiment, the stator 12 is first fitted onto the outer side of the tubular portion 72 of the reinforcement member 68 and then, the tubular portion 72 is fitted onto the outer side of the support shaft portion 6 of the stationary shaft 2 so that the stator 12 is correctly positioned as seated on the step 76 of the tubular portion 72 of the reinforcement member 68 which engages the step 7 of the support portion 6 of the shaft 2. While the plate portion 70 of the reinforcement member 68 is increased in physical strength with its the annular projection 78, the coil terminal 60 of the flexible printed circuit board 58 is neatly accommodated in the planar recess 80 defined by the annular projection 78. This allows the plate portion 70 to be minimized in thickness and positioning of the coil terminal 60 will be carried out effectively.

In addition, the bearing holder 44 in the second embodiment which is disposed between the second bearing 28 mounted to the lower end of the support shaft portion 6 of the stationary shaft 2 and the lower end of the inner side of the wall 34 of the rotor hub 30 is modified in shape, as compared with the first embodiment. The modified bearing holder 44 has a step 45 arranged on the lower end of the inner side thereof for supporting the outer race of the bearing 28. A lower portion of the modified bearing bolder 44, lower than the step 45, is enlarged radially and outwardly so that it comes into direct contact with the lower end of the inner side of the wall 34 of the rotor hub 30 where a flange 36 is disposed on the outer side. Accordingly, a small clearance 82 is produced between the bearing holder 44 and the wall portion 34 as located outwardly of the bearing 28.

An outer side of the modified bearing holder 44 which determines the clearance 82 needs be as smooth as the lower portion of the outer side of the bearing holder 44 arranged to directly face the inner side of the wall portion 34, thus contributing to the ease of machining the bearing holder. The bearing holder 44 is extensively beveled at its upper edge for ease in fitting the wall portion 34 of the rotor hub 30 onto the bearing holder.

It is advantageous to exploit the modified bearing holder 44. As the bearing holder 44 is directly fitted with its outer side lower end to the wall portion 34 of the rotor hub 30 so that their interface is axially departed from the second bearing 28, the second bearing 28 is prevented from being tensioned with stress produced during fitting of the wall portion 34 onto the bearing holder 44. Accordingly, any unwanted deflection or distortion of the bearing 28 will be avoided.

In addition, the lower end of the modified bearing holder 44 comes in direct contact with the lower end of the wall portion 34 where the flange 36 for supporting a disk is disposed on the opposite side thus, the radial thickness is increased giving greater physical strength. This allows the lower end of the wall portion 34 of the rotor hub 30 to be securely fitted onto the modified bearing holder 44, ensuring a stable rotating action of the rotor hub 30 about the bearing 28.

Figure 3:
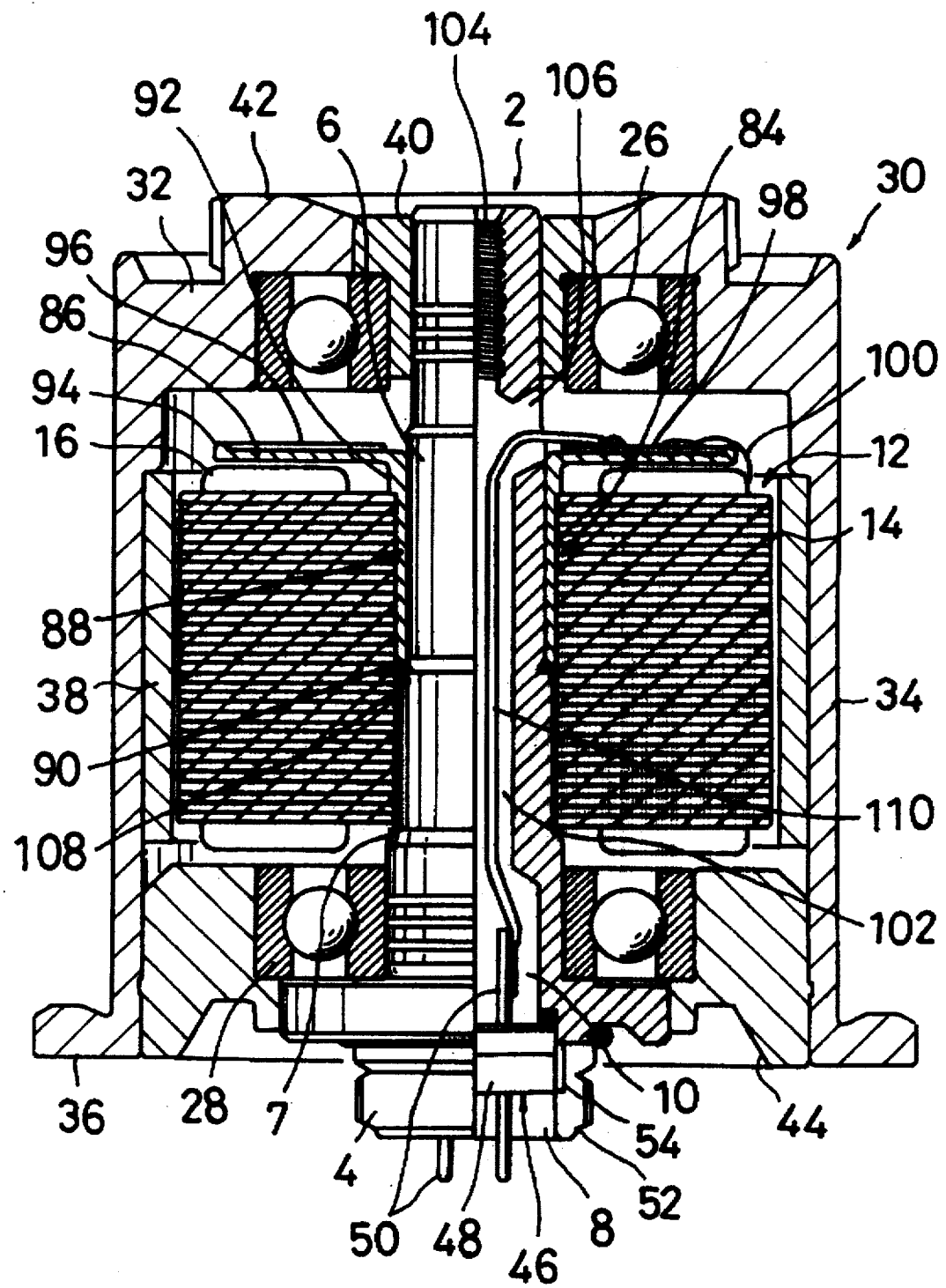
FIG. 3 is a cross sectional view of a third embodiment of a spindle motor according to the present invention.

A third embodiment of the present invention will be explained referring to FIG. 3.

In a spindle motor of the third embodiment, a reinforcement member 84 made of stainless steel is disposed above the stator 12. The reinforcement member 84 comprises an annular plate portion 86 with an inner diameter identical to the outer diameter of an intermediate portion of the support shaft portion 6 for shaft 2. A tubular portion 88 extends axially from the inner edge of the plate portion 86. The tubular portion 88 is radially decreased at its distal or lower end, producing a taper end 90 for ease in fitting the stator core 14 onto the portion 88 of the reinforcement member 84. Also, a step 92 is arranged on the outer side of the upper end of the tubular portion 88 for positioning the stator core 14. An annular projection 94 is provided on the outer edge of the plate portion 86 of the reinforcement member 84, extending upwardly or in the direction opposite to the stator 12. A planar recess 96 is thus created in the upper surface of the plate portion 86 as defined by the annular projection 94. The planar recess 96 accepts a flexible printed circuit board 98 of a ring or arcuate shape.

In assembly, the stator 12 is fitted onto the outer side of the tubular portion 88 of the reinforcement member 84 before the assembled elements are mounted to the stationary shaft 2. Then, coil leads 100 from the stator 12 are connected by soldering to a flexible printed circuit board 98 mounted on the plate portion 86 of the reinforcement member 84. When the stator 12 has been mounted to the reinforcement member 84 to form an assembly, the assembly is securely fitted onto the support shaft portion 6 of the stationary shaft 2.

The stationary shaft 2 comprises the mounting portion 4 for mounting to a base and the support shaft portion 6 extending upwardly from the mounting portion 4, which are integral with each other similar to that of the first or second embodiment. However, the support shaft portion 6 of the third embodiment is modified in shape. More particularly, the support shaft portion 6 has an axially extending center bore 102 provided therein and communicating with the opening 8 in the mounting portion 4. The center bore 102 also communicates at its upper end with a threaded hole 104 provided in the upper end of the support shaft portion 6. There is also a radial through hole 106 provided between the first bearing 26 and the plate portion 86 of the reinforcement member 84 in the side wall of the support shaft portion 6 for communication with the center bore 102. The support shaft portion 6 has an annular upwardly facing step 108 on an intermediate portion thereof. The step 108 engages the lower end of the tubular portion 88 to locate the stator 12 precisely relative to the stationary shaft 2.

In assembly, after the stator 12 is fixedly mounted by the reinforcement member 84 to the stationary shaft 2, the connector 46 is installed into the opening 8. The pins 50 of the connector 46 have-leads 110 soldered at one end thereto respectively for extending through the center bore 102. The installation of the connector 46 into the opening 8 follows the insertion of its leads 110 from the opening 8 into the center bore 102. The other ends of the leads 110 are then passed from the center bore 102 through the hole 106 to the plate portion 86 of the reinforcement member 84 and soldered to the flexible printed circuit board 98. Accordingly, the coil leads 100 from the stator 12 are electrically connected by the flexible printed circuit board 98 and the leads 110 to the pins 50 of the connector 46.

The stator 12 in the spindle motor of the third embodiment is fixedly mounted to the stationary shaft 2 by the reinforcement member 84 provided with the flexible printed circuit board 98 and their assembly will thus be implemented easily and efficiently, the coil leads 100 being connected without difficulty as well. In the third embodiment, the leads 110 are used for connection between the connector 46 and the flexible printed circuit board 98. As the leads 110 are connected to the upper side of the flexible printed circuit board 98, their soldering will be carried out from above thus increasing the efficiency of the assembly.

It will be understood that the present invention is not limited to the prescribed embodiments of the spindle motor but various modifications and changes may be made without departing from the scope and spirit of the present invention.

I claim:

1. A spindle motor comprising:
   a stationary shaft having an inner bore at an outer end portion in its axial direction and a hole communicating the inner bore with the interior of the motor;
   a cup-shaped rotor hub rotatably supported by the shaft via a bearing;
   a cylindrical rotor magnet fixed to the interior of the rotor hub;
   a flexible printed circuit board having a plurality of electrically conductive lines;
   a stator disposed to oppose the rotor magnet and including a stator core and coils wound around the stator core;
   a wire lead from each of the coils connected to the flexible printed circuit board;
   a reinforcing member having a cylindrical portion and an annular substantially flat plate portion extending radially outwardly from one end of the cylindrical portion, the stator being fixed to the outer circumferential surface of the cylindrical portion, the flexible printed circuit board being attached to the annular flat plate portion on the side opposite from the stator;
   a connector having a body of insulating material and a plurality of connective pins supported by the connector body to extend therethrough with upper and lower end portions of the pins exposed outside of the connector body, the connector body being fixed in the inner bore of the shaft and the upper end portions of the pins being electrically connected with circuit board wire leads which pass through the communicating hole.

2. A spindle motor according to claim 1, wherein the shaft has an annular step portion on the outer circumferential surface for positioning and supporting the reinforcing member.

3. A spindle motor according to claim 1, wherein the reinforcing member has an annular step portion on the outer circumferential surface of the cylindrical portion for positioning and supporting the stator.

4. A spindle motor according to claim 1, wherein the annular flat plate portion of the reinforcing member is surrounded with an annular projection which projects to the opposite direction of the stator side.

5. A spindle motor according to claim 1, wherein the flexible printed circuit board is mounted in an annular recess formed by the annular projection on the annular flat plate portion.

6. A spindle motor comprising:
   a stationary shaft having an inner bore at an outer end portion in its axial direction and a hole communicating the inner bore with the interior of the motor;
   a cup-shaped rotor hub having a cylindrical side wall;
   a rotor magnet fixed to the cylindrical side wall of the rotor hub;

a flange member integrally formed with the rotor hub at the lower end portion of the cylindrical side wall and extending radially outwardly for mounting data storage disks;

bearing members mounted on the upper and lower portions of the shaft for rotatably supporting the rotor hub;

an annular bushing holding an outer race of the lower bearing member and being in contact with the inner surface of the cylindrical side wall;

a flexible printed circuit board having a plurality of electrically conductive lines;

a stator disposed to oppose the rotor magnet and including a stator core and coils wound around the stator core;

a wire lead from each of the coils connected to the flexible printed circuit board;

a reinforcing member having a cylindrical portion and an annular substantially flat plate portion extending radially outwardly from one end of the cylindrical portion, the stator being fixed to the outer circumferential surface of the cylindrical portion, the flexible printed circuit board being attached to the annular flat plate portion on the side opposite from the stator;

a connector having a body made of insulating material and a plurality of connective pins supported by the connector body to extend therethrough with upper and lower end portions of the pins exposed outside of the connector body, the connector body being fixed in the inner bore of the shaft and the upper end portion of the pins being electrically connected with the core wire leads via the flexible printed circuit board and circuit board leads which pass through the communicating hole.

7. A spindle motor according to claim 6, wherein the shaft has an annular step portion on the outer circumferential surface for positioning and supporting the reinforcing member.

8. A spindle motor according to claim 6, wherein the reinforcing member has an annular step portion on the outer circumferential surface of the cylindrical portion for positioning and supporting the stator.

9. A spindle motor according to claim 6, wherein the annular flat plate portion of the reinforcing member is surrounded with an annular projection which projects to the opposite direction of the stator side.

10. A spindle motor according to claim 6, wherein the flexible printed circuit board is mounted in an annular recess which is formed by the annular projection on the annular flat plate portion.

11. A spindle motor according to claim 6, wherein the outer surface of the annular bushing supports the rotor hub opposite an external flange which is formed axially below the bearing holding portion of the annular bushing.

* * * * *